US012588059B2

(12) United States Patent　　(10) Patent No.: US 12,588,059 B2
Kim　　(45) Date of Patent: Mar. 24, 2026

(54) DATA IN COMMUNICATION SYSTEM SUPPORTING MULTIPLE LINKS

(71) Applicants: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

(72) Inventor: Yong Ho Kim, Incheon (KR)

(73) Assignees: HYUNDAI MOTOR COMPANY, Seoul (KR); Kia Corporation, Seoul (KR); KOREA NATIONAL UNIVERSITY OF TRANSPORTATION INDUSTRY-ACADEMIC COOPERATION FOUNDATION, Chungju-si (KR)

( * ) Notice: Subject to any disclaimer, the term of this patent is extended or adjusted under 35 U.S.C. 154(b) by 333 days.

(21) Appl. No.: 18/385,166

(22) Filed: Oct. 30, 2023

(65) Prior Publication Data

US 2024/0080887 A1　　Mar. 7, 2024

Related U.S. Application Data

(63) Continuation-in-part of application No. PCT/KR2022/005779, filed on Apr. 22, 2022.

(30) Foreign Application Priority Data

Apr. 30, 2021　(KR) ........................ 10-2021-0056604

(51) Int. Cl.
H04W 74/00 (2009.01)
H04W 28/02 (2009.01)
(Continued)

(52) U.S. Cl.
CPC ....... H04W 74/0808 (2013.01); H04W 76/20 (2018.02)

(58) Field of Classification Search
None
See application file for complete search history.

(56) References Cited

U.S. PATENT DOCUMENTS 8,532,140 B2 * 9/2013 Shimizu ............ H04W 74/0866
455/515
10,939,476 B1 * 3/2021 Chu ...................... H04W 76/15
(Continued)

FOREIGN PATENT DOCUMENTS

EP　　　　3998799 A1　5/2022
KR　10-2020-0014427 A　2/2020
(Continued)

OTHER PUBLICATIONS

M. Rison, IEEE 802.11-21/0218r0, IEEE Standards Association, Feb. 11, 2021.

*Primary Examiner* — Sai Aung
(74) *Attorney, Agent, or Firm* — MORGAN, LEWIS & BOCKIUS LLP

(57) ABSTRACT

Disclosed are a method and device for transmitting and receiving data in a communication system supporting multiple links. The method of a first device comprises the steps of: performing a first backoff operation for a first AC in a first link; performing a second backoff operation for a second AC in the first link; performing a third backoff operation for a third AC in a second link; if the first backoff operation and the second backoff operation in the first link are performed successfully, selecting one AC from among the first AC and the second AC; and, if the third backoff operation is performed successfully, simultaneously performing a first transmission operation of a first frame comprising a data unit corresponding to the selected one AC (Continued)

in the first link and a second transmission operation of a second frame comprising a data unit corresponding to the third AC in the second link.

20 Claims, 10 Drawing Sheets

(51) Int. Cl.
| | | |
|---|---|---|
| *H04W 72/04* | (2023.01) | |
| *H04W 74/0808* | (2024.01) | |
| *H04W 74/0816* | (2024.01) | |
| *H04W 76/20* | (2018.01) | |

(56) References Cited

U.S. PATENT DOCUMENTS

| | | | |
|---|---|---|---|
| 2010/0309877 A1* | 12/2010 | Damnjanovic ... | H04W 74/0866 |
| | | | 370/329 |
| 2012/0008490 A1* | 1/2012 | Zhu ...................... | H04W 72/56 |
| | | | 370/216 |
| 2016/0338053 A1* | 11/2016 | Park ................... | H04W 74/0808 |
| 2018/0220457 A1* | 8/2018 | Koorapaty ........... | H04W 24/02 |
| 2018/0317264 A1* | 11/2018 | Agiwal .............. | H04W 52/325 |
| 2019/0098540 A1* | 3/2019 | Lee ...................... | H04W 76/11 |
| 2019/0191414 A1 | 6/2019 | Bang et al. | |
| 2020/0100296 A1 | 3/2020 | Roy et al. | |

FOREIGN PATENT DOCUMENTS

| | | | |
|---|---|---|---|
| KR | 10-2021-0004869 A | 1/2021 | |
| KR | 10-2021-0007881 A | 1/2021 | |
| KR | 10-2021-0007897 A | 1/2021 | |
| WO | 2021/006545 A1 | 1/2021 | |

* cited by examiner

【FIG. 1】
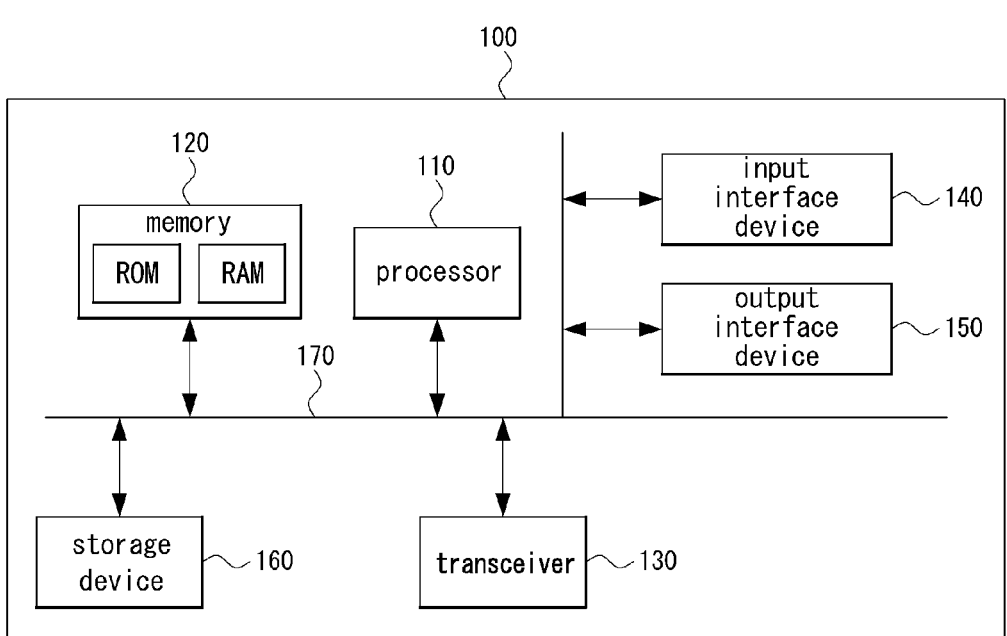

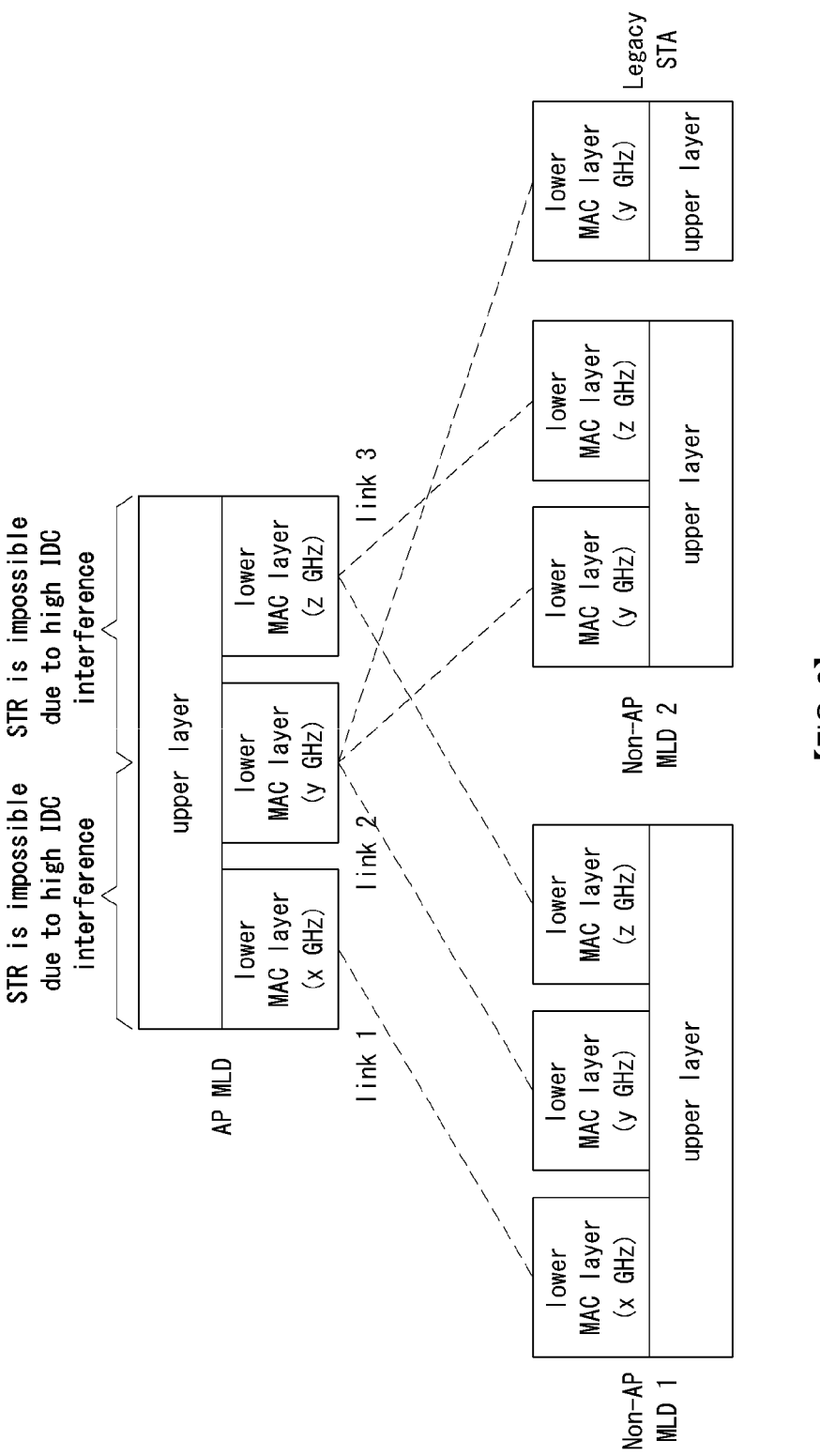
[FIG. 2]

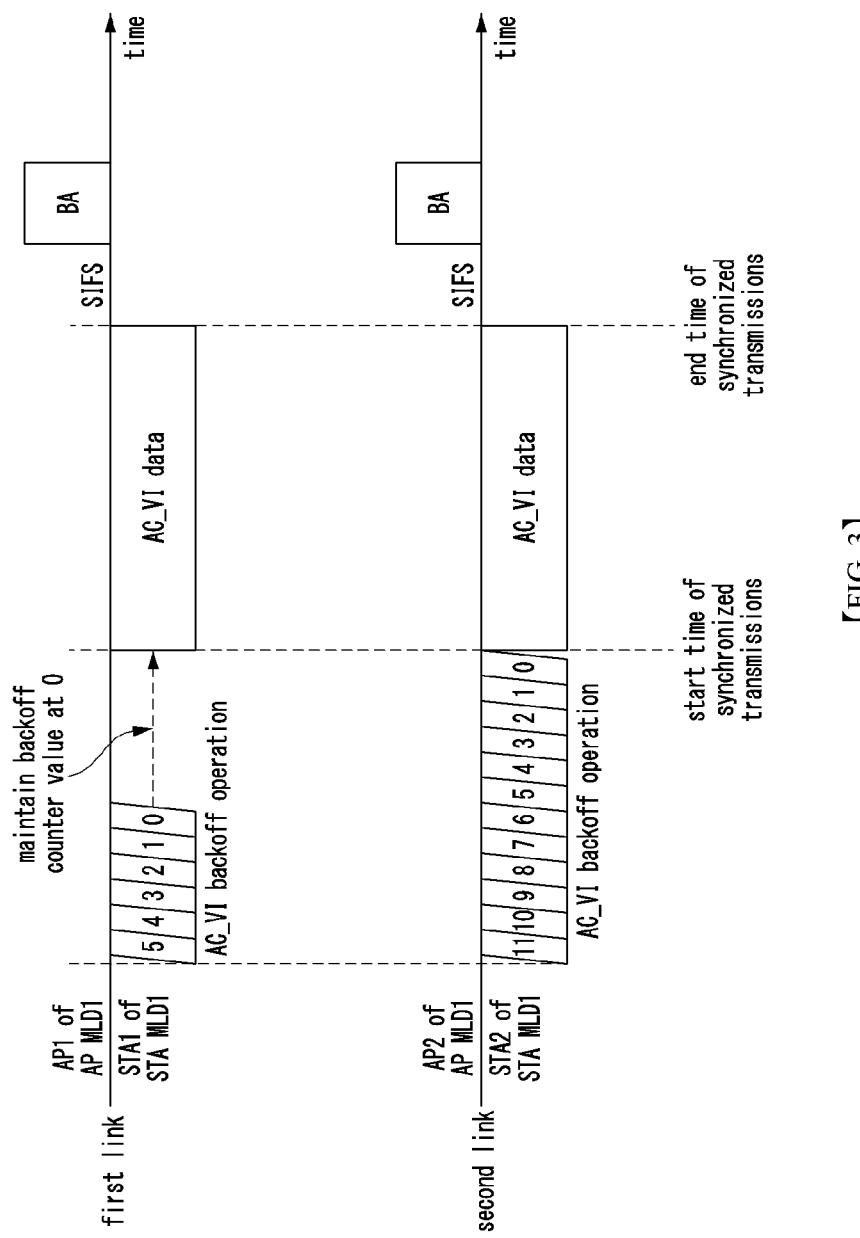
[FIG. 3]

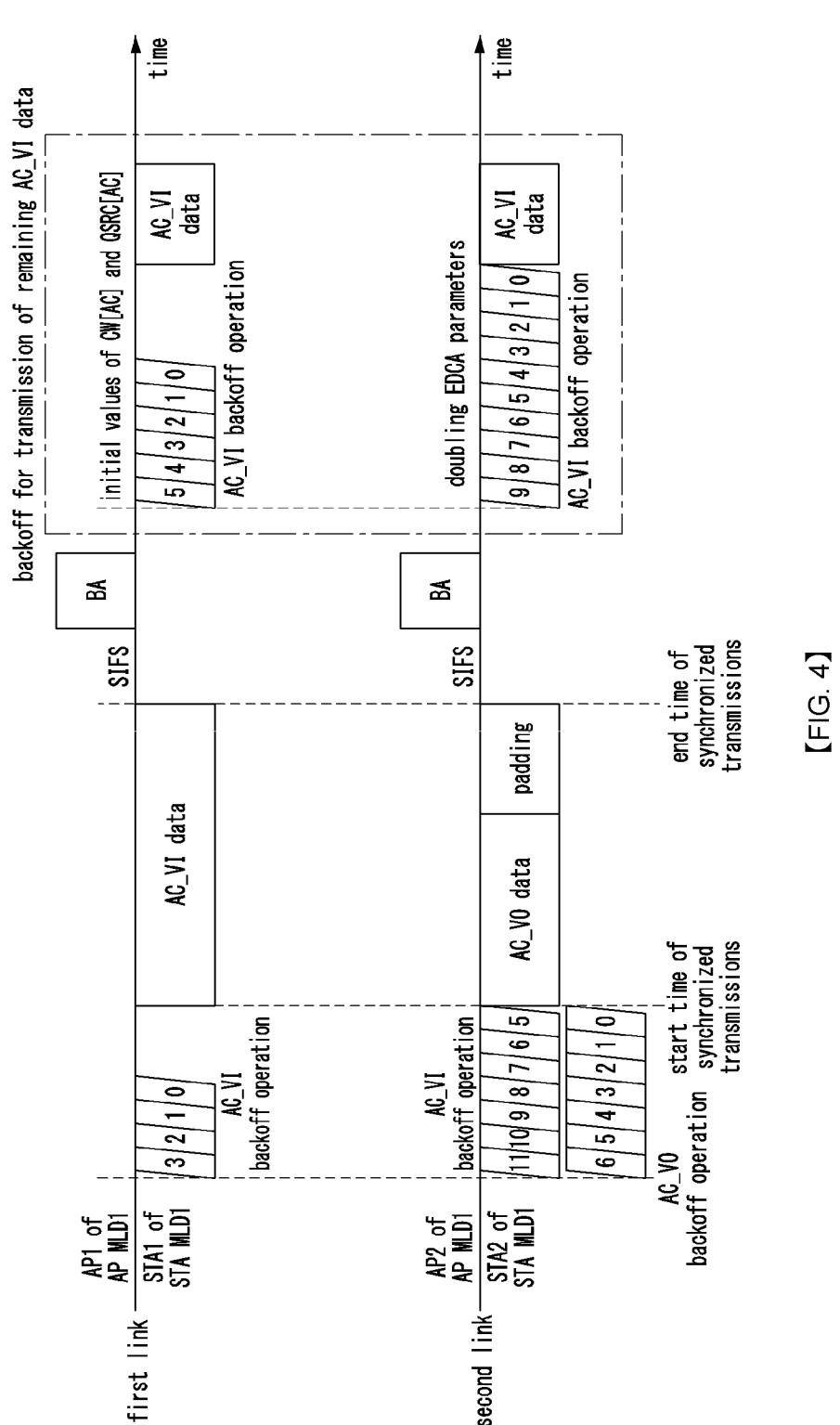
[FIG. 4]

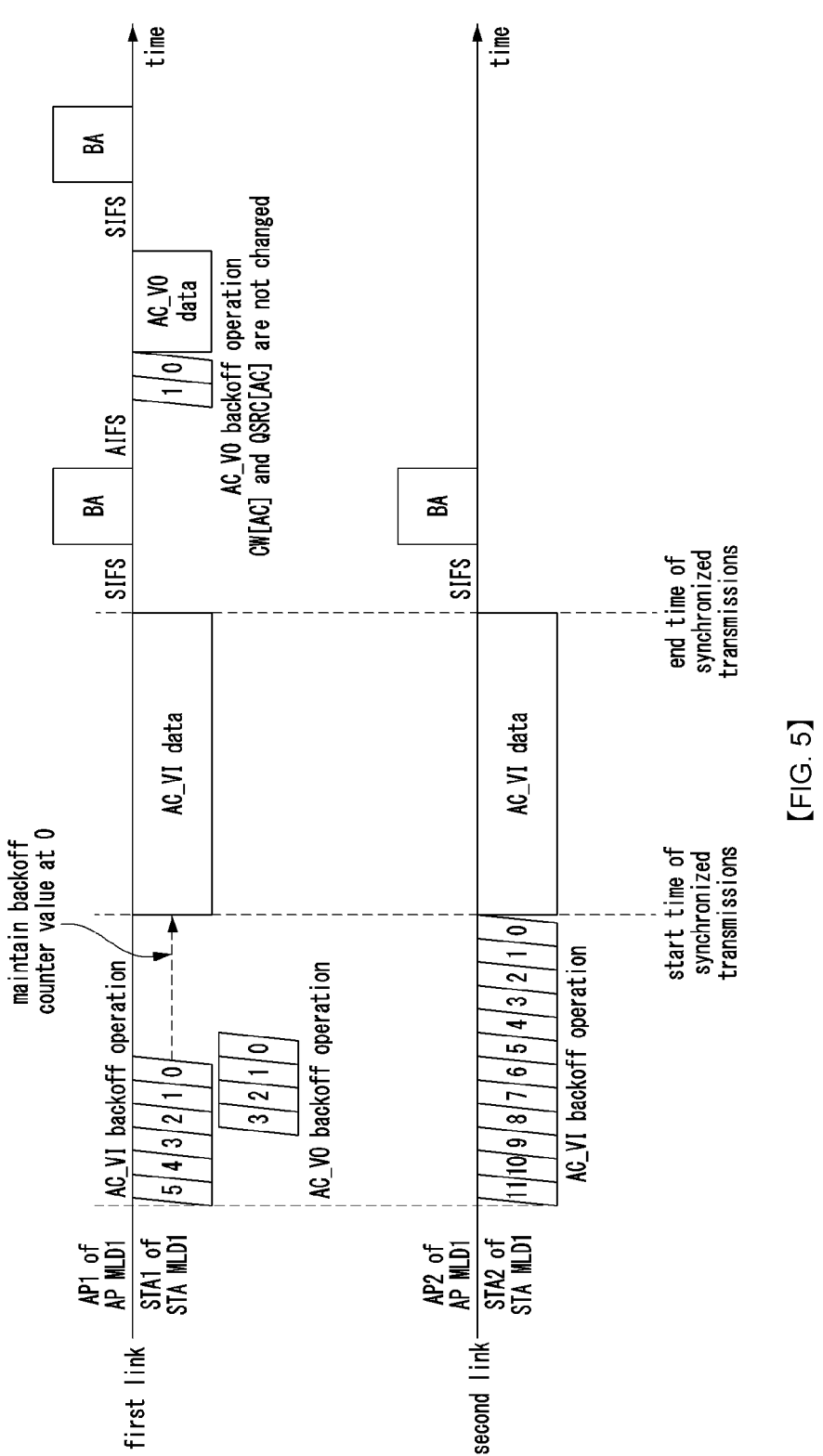
[FIG. 5]

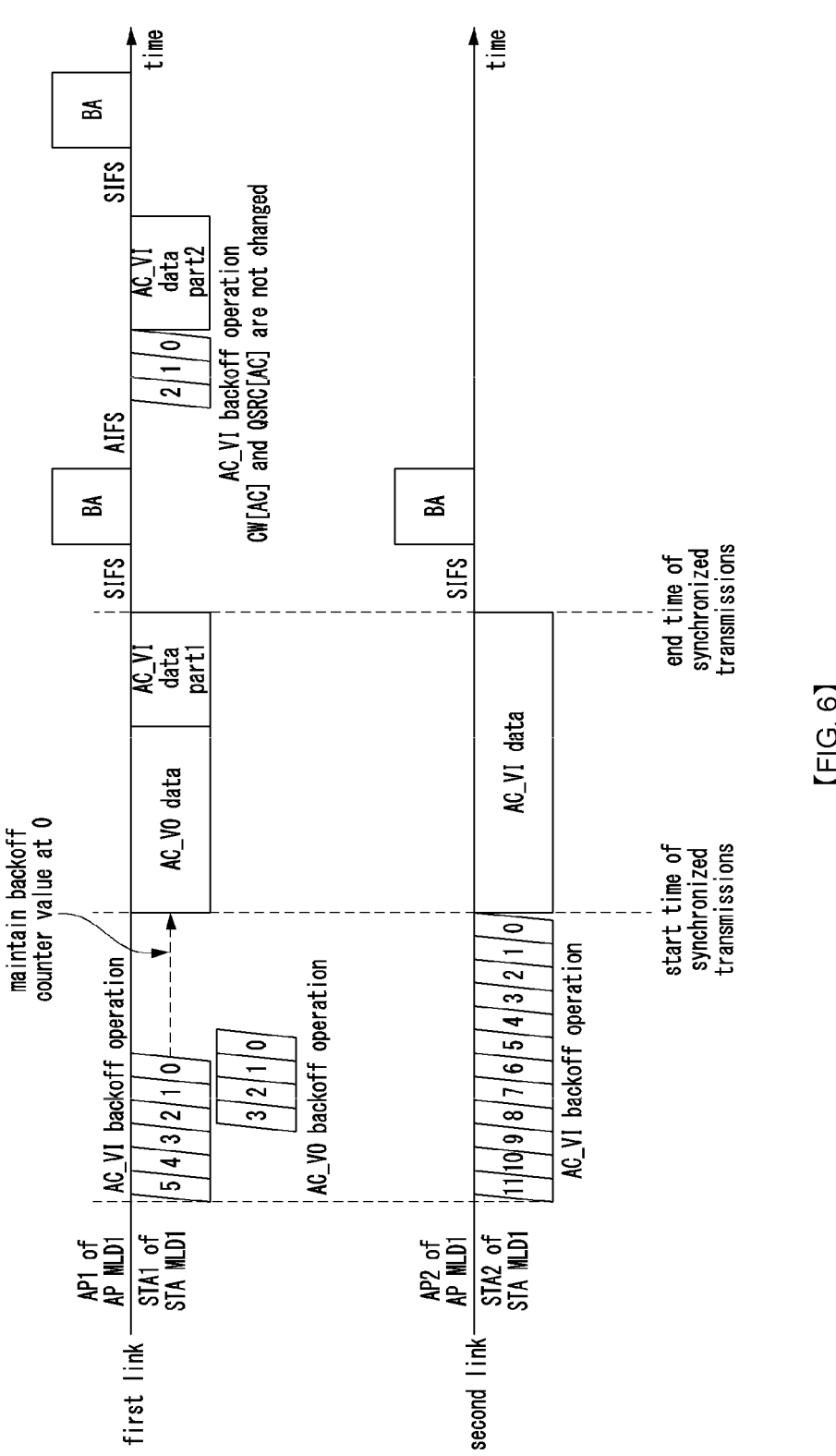
[FIG. 6]

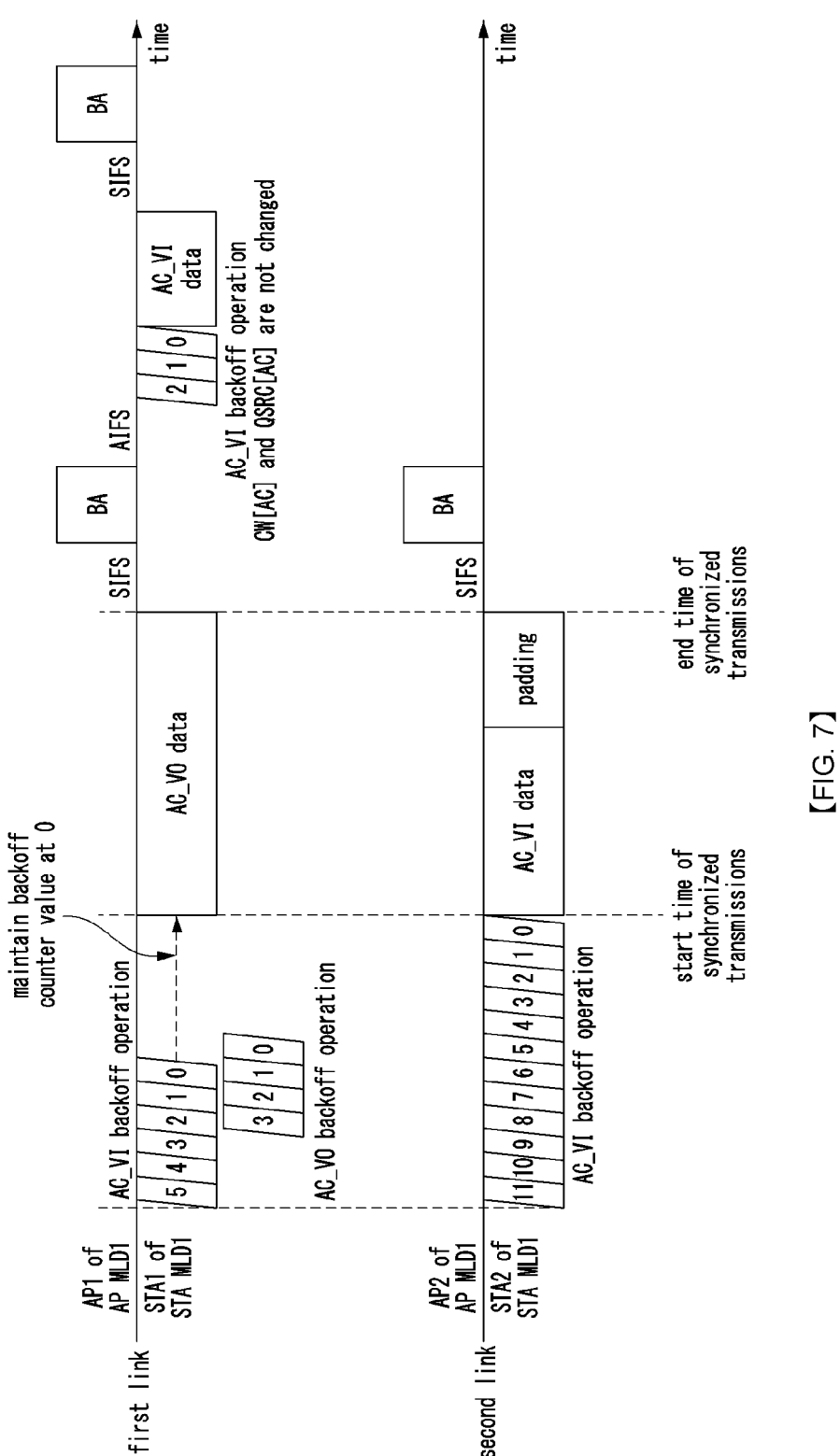
[FIG. 7]

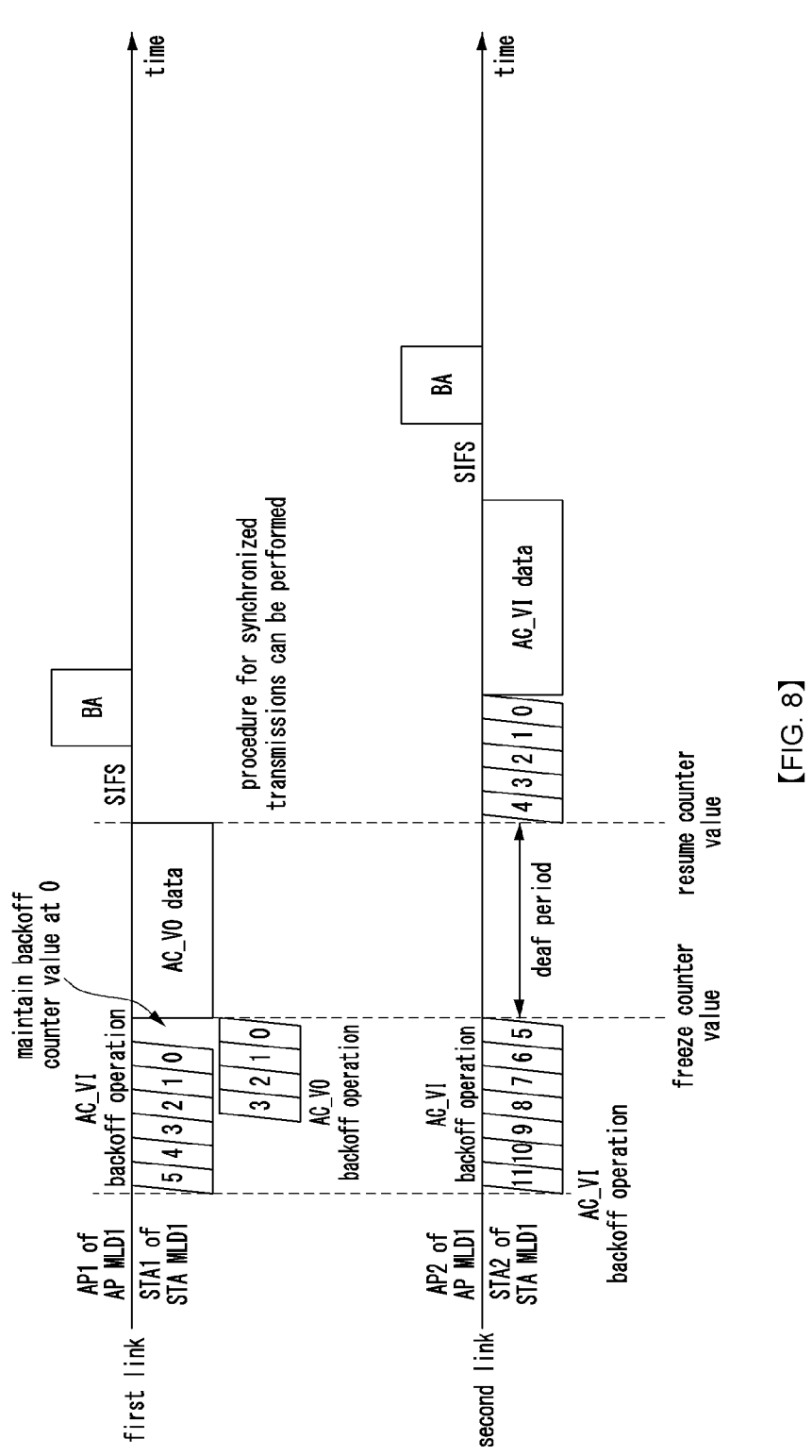
[FIG. 8]

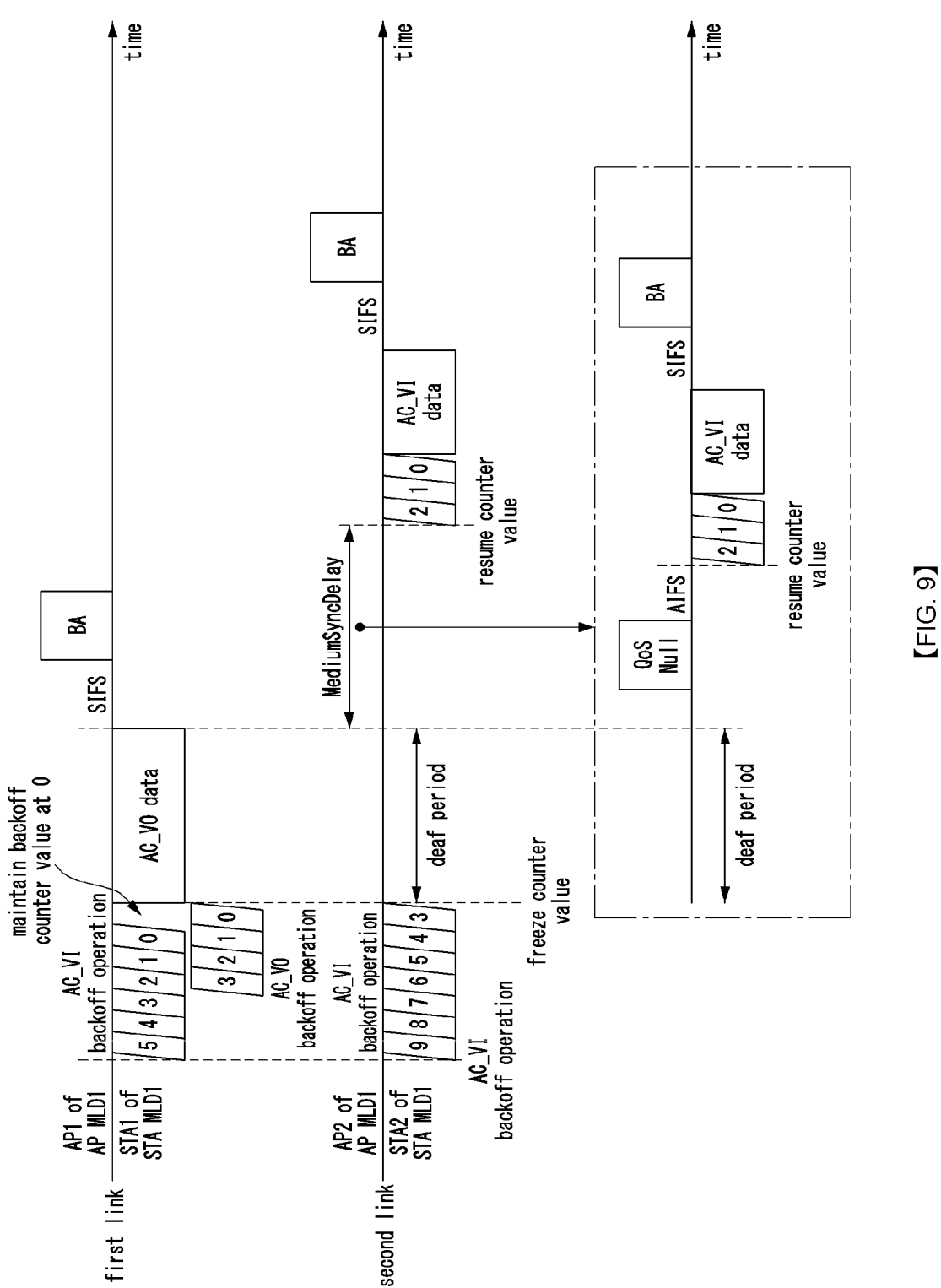
[FIG. 9]

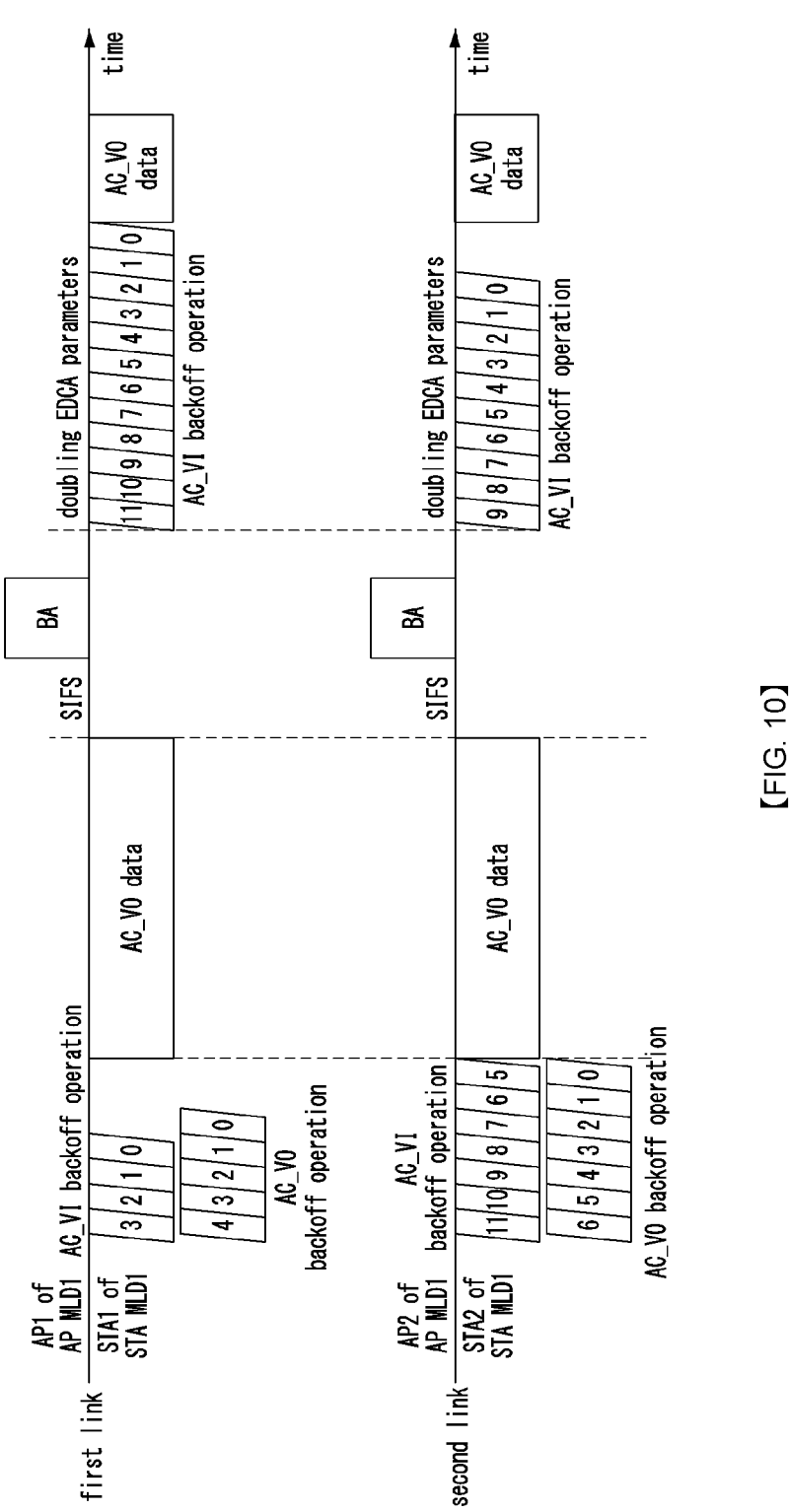
[FIG. 10]

DATA IN COMMUNICATION SYSTEM SUPPORTING MULTIPLE LINKS

TECHNICAL FIELD

The present disclosure relates to a wireless local area network (LAN) communication technique, and more particularly, to a technique for transmission and reception of data in a device that does not support a simultaneous transmit and receive (STR) operation.

BACKGROUND ART

Recently, as the spread of mobile devices expands, a wireless local area network technology capable of providing fast wireless communication services to mobile devices is in the spotlight. The wireless LAN technology may be a technology that supports mobile devices such as smart phones, smart pads, laptop computers, portable multimedia players, embedded devices, and the like to wirelessly access the Internet based on wireless communication technology.

The standards using the wireless LAN technology are being standardized as IEEE802.11 standards mainly in the Institute of Electrical and Electronics Engineers (IEEE). As the above-described wireless LAN technologies have been developed and spread, applications using the wireless LAN technologies have been diversified, and a demand for a wireless LAN technology supporting a higher throughput has arisen. Accordingly, a frequency bandwidth (e.g., 'maximum 160 MHz bandwidth' or '80+80 MHz bandwidth') used in the IEEE 802.11ac standard has been expanded, and the number of supported spatial streams has also increased. The IEEE 802.11ac standard may be a very high throughput (VHT) wireless LAN technology supporting a high throughput of 1 gigabit per second (Gbps) or more. The IEEE 802.11ac standard can support downlink transmission for multiple stations by utilizing the MIMO techniques.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g., 320 MHz bandwidth), multi-link transmission and aggregation operations including multi-band operations, multiple access point (AP) transmission operations, and/or efficient retransmission operations (e.g., hybrid automatic repeat request (HARQ) operations).

However, since multi-link operations are operations not defined in the existing wireless LAN standard, it may be necessary to define detailed operations according to an environment in which the multi-link operations are performed. In particular, when two or more links are adjacent, simultaneous transmit and receive (STR) operations may not be performed on a multi-link due to interference from adjacent links (e.g., adjacent bands, adjacent channels). If a level of signal interference between adjacent links is above a certain level, a channel sensing operation and/or signal reception operation for transmission on another link may not be performed due to the interference while a transmission operation is performed on one link. In the above-described situation, methods for transmitting and receiving data based on a channel access procedure considering a transmission and reception status of the one link may be required.

Meanwhile, the technologies that are the background of the present disclosure are written to improve the understanding of the background of the present disclosure and may include content that is not already known to those of ordinary skill in the art to which the present disclosure belongs.

DISCLOSURE

Technical Problem

The present disclosure is directed to providing a method and an apparatus for transmission and reception of data for a device that does not support a simultaneous transmit and receive (STR) operation in a communication system supporting multiple links.

Technical Solution

A method of a first device, according to a first exemplary embodiment of the present disclosure for achieving the above-described objective, may comprise: performing a first backoff operation for a first access category (AC) on a first link; performing a second backoff operation for a second AC on the first link; performing a third backoff operation for a third AC on a second link; in response to that the first backoff operation and the second backoff operation succeed on the first link, selecting one AC from among the first AC and the second AC; and in response to that the third backoff operation succeeds, simultaneously performing a first transmission operation of a first frame including a data unit corresponding to the one AC on the first link and a second transmission operation of a second frame including a data unit corresponding to the third AC on the second link.

The method may further comprise: in response to that the first transmission operation and the second transmission operation are completed, performing a fourth backoff operation for an unselected AC other than the one AC among the first AC and the second AC, wherein enhanced distributed channel access (EDCA) parameters used in the fourth backoff operation may be same as EDCA parameters used in a previous backoff operation of the unselected AC, and the previous backoff operation may be the first backoff operation or the second backoff operation.

The EDCA parameters may include at least one of CW[AC] or QSRC[AC], where the CW[AC] is a content window (CW) for each AC, and the QSRC[AC] is a quality of service (QoS) short retry counter (QSRC) for each AC.

When at least one backoff operation among the first backoff operation and the second backoff operation succeeds before the third backoff operation succeeds, a counter value of the at least one backoff operation may be maintained at 0.

When at least one backoff operation among the first backoff operation and the second backoff operation succeeds before the third backoff operation succeeds, a data unit corresponding to an AC associated with the at least one backoff operation may not be transmitted.

The data unit corresponding to the one AC may be a data unit corresponding to an AC associated with a backoff operation that succeeds first among the first backoff operation and the second backoff operation.

The data unit corresponding to the one AC may be a data unit corresponding to an AC having a higher priority among the first AC and the second AC.

Padding bit(s) may be added to one of the first frame and the second frame in order to align end times of the first transmission operation and the second transmission operation.

A portion of the first data unit may be added to one of the first frame and the second frame in order to align end times of the first transmission operation and the second transmission operation.

The first data unit may be a data unit other than the data unit corresponding to the one AC among a data unit corresponding to the first AC and a data unit corresponding to the second AC.

A first device, according to a second exemplary embodiment of the present disclosure for achieving the above-described objective, may comprise: a processor; and a memory storing one or more instructions executable by the processor, wherein the one or more instructions are executed to perform: performing a first backoff operation for a first access category (AC) on a first link; performing a second backoff operation for a second AC on the first link; performing a third backoff operation for a third AC on a second link; in response to that the first backoff operation and the second backoff operation succeed on the first link, selecting one AC from among the first AC and the second AC; and in response to that the third backoff operation succeeds, simultaneously performing a first transmission operation of a first frame including a data unit corresponding to the one AC on the first link and a second transmission operation of a second frame including a data unit corresponding to the third AC on the second link.

The one or more instructions may be further executed to perform: in response to that the first transmission operation and the second transmission operation are completed, performing a fourth backoff operation for an unselected AC other than the one AC among the first AC and the second AC, wherein enhanced distributed channel access (EDCA) parameters used in the fourth backoff operation may be same as EDCA parameters used in a previous backoff operation of the unselected AC, and the previous backoff operation may be the first backoff operation or the second backoff operation.

The EDCA parameters may include at least one of CW[AC] or QSRC[AC], where the CW[AC] is a content window (CW) for each AC, and the QSRC[AC] is a quality of service (QoS) short retry counter (QSRC) for each AC.

When at least one backoff operation among the first backoff operation and the second backoff operation succeeds before the third backoff operation succeeds, a counter value of the at least one backoff operation may be maintained at 0.

When at least one backoff operation among the first backoff operation and the second backoff operation succeeds before the third backoff operation succeeds, a data unit corresponding to an AC associated with the at least one backoff operation may not be transmitted.

The data unit corresponding to the one AC may be a data unit corresponding to an AC associated with a backoff operation that succeeds first among the first backoff operation and the second backoff operation.

The data unit corresponding to the one AC may be a data unit corresponding to an AC having a higher priority among the first AC and the second AC.

Padding bit(s) may be added to one of the first frame and the second frame in order to align end times of the first transmission operation and the second transmission operation.

A portion of the first data unit may be added to one of the first frame and the second frame in order to align end times of the first transmission operation and the second transmission operation.

The first data unit may be a data unit other than the data unit corresponding to the one AC among a data unit corresponding to the first AC and a data unit corresponding to the second AC.

Advantageous Effects

According to the present disclosure, communication between devices (e.g., stations, access points) may be performed using a multi-link. When some links (e.g., some channels) of the multi-link are adjacent, a simultaneous transmit and receive (STR) operation may not be performed. When a first device performs transmission using a first link and a second link of the multi-link, if channel access operations are completed on both the first link and the second link, the first device may perform transmission operations simultaneously using the two links. Accordingly, transmission efficiency can be improved.

DESCRIPTION OF DRAWINGS

FIG. 1 is a block diagram illustrating a first exemplary embodiment of a communication node constituting a wireless LAN system.

FIG. 2 is a conceptual diagram illustrating a first exemplary embodiment of a multi-link configured between multi-link devices (MLDs).

FIG. 3 is a timing diagram illustrating a first exemplary embodiment of a multi-link synchronized channel access method in a wireless LAN system supporting a multi-link.

FIG. 4 is a timing diagram illustrating a second exemplary embodiment of a multi-link synchronized channel access method in a wireless LAN system supporting a multi-link.

FIG. 5 is a timing diagram illustrating a third exemplary embodiment of a multi-link synchronized channel access method in a wireless LAN system supporting a multi-link.

FIG. 6 is a timing diagram illustrating a fourth exemplary embodiment of a multi-link synchronized channel access method in a wireless LAN system supporting a multi-link.

FIG. 7 is a timing diagram illustrating a fifth exemplary embodiment of a multi-link synchronized channel access method in a wireless LAN system supporting a multi-link.

FIG. 8 is a timing diagram illustrating a sixth exemplary embodiment of a multi-link synchronized channel access method in a wireless LAN system supporting a multi-link.

FIG. 9 is a timing diagram illustrating a seventh exemplary embodiment of a multi-link synchronized channel access method in a wireless LAN system supporting a multi-link.

FIG. 10 is a timing diagram illustrating an eighth exemplary embodiment of a multi-link synchronized channel access method in a wireless LAN system supporting a multi-link.

MODE FOR INVENTION

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

In the following, a wireless communication system to which exemplary embodiments according to the present disclosure are applied will be described. The wireless communication system to which the exemplary embodiments according to the present disclosure are applied is not limited to the contents described below, and the exemplary embodiments according to the present disclosure can be applied to various wireless communication systems. A wireless communication system may be referred to as a 'wireless communication network'.

FIG. 1 is a block diagram illustrating a first exemplary embodiment of a communication node constituting a wireless LAN system.

As shown in FIG. 1, a communication node 100 may be an access point, a station, an access point (AP) multi-link device (MLD), or anon-AP MLD. An access point may refer to 'AP', and a station may refer to 'STA' or 'non-AP STA'. An operating channel width supported by an AP may be 20 megahertz (MHz), 80 MHz, 160 MHz, or the like. An operating channel width supported by a STA may be 20 MHz, 80 MHz, or the like.

The communication node 100 may include at least one processor 110, a memory 120, and a transceiver 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The respective components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute program commands stored in at least one of the memory 120 and the storage device 160. The processor 110 may refer to a central processing unit (CPU), a graphics processing unit (GPU), or a dedicated processor on which the methods according to the exemplary embodiments of the present invention are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

FIG. 2 is a conceptual diagram illustrating a first exemplary embodiment of a multi-link configured between multi-link devices (MLDs).

As shown in FIG. 2, an MLD may have one medium access control (MAC) address. In exemplary embodiments, the MLD may mean an AP MLD and/or non-AP MLD. The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) affiliated with the non-AP MLD may have different MAC addresses. Each of the APs having different MAC addresses within the AP MLD may be in charge of each link, and may perform a role of an independent AP.

Each of the STAs having different MAC addresses within the non-AP MLD may be in charge of each link, and may perform a role of an independent STA. The non-AP MLD may be referred to as a STA MLD. The MLD may support a simultaneous transmit and receive (STR) operation. In this case, the MLD may perform a transmission operation in a link 1 and may perform a reception operation in a link 2. The MLD supporting the STR operation may be referred to as an STR MLD (e.g., STR AP MLD, STR non-AP MLD). In exemplary embodiments, a link may mean a channel or a band. A device that does not support the STR operation may be referred to as a non-STR (NSTR) AP MLD or an NSTR non-AP MLD (or NSTR STA MLD).

The MLD may transmit and receive frames in multiple links by using a non-contiguous bandwidth extension scheme (e.g., 80 MHz+80 MHz). The multi-link operation may include multi-band transmission. The AP MLD may include a plurality of APs, and the plurality of APs may operate in different links. Each of the plurality of APs may perform function(s) of a lower MAC layer. Each of the plurality of APs may be referred to as a 'communication node' or 'lower entity'. The communication node (i.e., AP) may operate under control of an upper layer (or the processor 110 shown in FIG. 1). The non-AP MLD may include a plurality of STAs, and the plurality of STAs may operate in different links. Each of the plurality of STAs may be referred to as a 'communication node' or 'lower entity'. The communication node (i.e., STA) may operate under control of an upper layer (or the processor 110 shown in FIG. 1).

The MLD may perform communications in multiple bands (i.e., multi-band). For example, the MLD may perform communications using an 80 MHz bandwidth according to a channel expansion scheme (e.g., bandwidth expansion scheme) in a 2.4 GHz band, and perform communications using a 160 MHz bandwidth according to a channel expansion scheme in a 5 GHz band. The MLD may perform communications using a 160 MHz bandwidth in the 5 GHz band, and may perform communications using a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link. Alternatively, each link may be referred to as a link 1, a link 2, a link 3, or the like. A link number may be set by an access point, and an identifier (ID) may be assigned to each link.

The MLD (e.g., AP MLD and/or non-AP MLD) may configure a multi-link by performing an access procedure and/or a negotiation procedure for a multi-link operation. In this case, the number of links and/or link(s) to be used in the multi-link may be configured. The non-AP MLD (e.g., STA) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g., IEEE 802.11a/b/g/n/ac/ax STA) may be connected to one or more links of the multi-link supported by the AP MLD.

When a band separation between multiple links (e.g., a band separation between a link 1 and a link 2 in the frequency domain) is sufficient, the MLD may be able to perform an STR operation. For example, the MLD may transmit a physical layer convergence procedure (PLCP) protocol data unit (PPDU) 1 using the link 1 among multiple links, and may receive a PPDU 2 using the link 2 among multiple links. On the other hand, if the MLD performs an STR operation when the band separation between multiple links is not sufficient, in-device coexistence (IDC) interference, which is interference between the multiple links, may occur.

Accordingly, when the bandwidth separation between multiple links is not sufficient, the MLD may not be able to perform an STR operation. A link pair having the above-described interference relationship may be a non-simultaneous transmit and receive (NSTR)-limited link pair. Here, the MLD may be an NSTR AP MLD or NSTR non-AP MLD.

For example, a multi-link including a link 1, a link 2, and a link 3 may be configured between an AP MLD and a non-AP MLD 1. When a band separation between the link 1 and the link 3 is sufficient, the AP MLD may perform an STR operation using the link 1 and the link 3. That is, the AP MLD may transmit a frame using the link 1 and receive a frame using the link 3. When a band separation between the link 1 and the link 2 is insufficient, the AP MLD may not be able to perform an STR operation using the link 1 and the link 2. When a band separation between the link 2 and the link 3 is not sufficient, the AP MLD may not be able to perform an STR operation using the link 2 and the link 3.

Meanwhile, in a wireless LAN system, a negotiation procedure for a multi-link operation may be performed in an access procedure between a station and an access point.

A device (e.g., access point, station) that supports multiple links may be referred to as 'multi-link device (MLD)'. An access point supporting multiple links may be referred to as 'AP MLD', and a station supporting multiple links may be referred to as 'non-AP MLD' or 'STA MLD'. The AP MLD may have a physical address (e.g., MAC address) for each link. The AP MLD may be implemented as if an AP in charge of each link exists separately. A plurality of APs may be managed within one AP MLD. Therefore, coordination between a plurality of APs belonging to the same AP MLD may be possible. A STA MLD may have a physical address (e.g., MAC address) for each link. The STA MLD may be implemented as if a STA in charge of each link exists separately. A plurality of STAs may be managed within one STA MLD. Therefore, coordination between a plurality of STAs belonging to the same STA MLD may be possible.

For example, an APT of the AP MLD and a STAT of the STA MLD may each be responsible for a first link and perform communication using the first link. An AP2 of the AP MLD and a STA2 of the STA MLD may each be responsible for a second link and perform communication using the second link. The STA2 may receive status change information for the first link on the second link. In this case, the STA MLD may collect information (e.g., status change information) received on the respective links, and control operations performed by the STA1 based on the collected information.

Hereinafter, data transmission and reception methods in a wireless LAN system will be described. Even when a method (e.g., transmission or reception of a signal) performed at a first communication node among communication nodes is described, a corresponding second communication node may perform a method (e.g., reception or transmission of the signal) corresponding to the method performed at the first communication node. That is, when an operation of a STA is described, an AP corresponding thereto may perform an operation corresponding to the operation of the STA. Conversely, when an operation of an AP is described, a STA corresponding thereto may perform an operation corresponding to the operation of the AP. In exemplary embodiments, an operation of a STA may be interpreted as an operation of a STA MLD, an operation of a STA MLD may be interpreted as an operation of a STA, an operation of an AP may be interpreted as an operation of an AP MLD, and an operation of an AP MLD may be interpreted as an operation of an AP.

FIG. 3 is a timing diagram illustrating a first exemplary embodiment of a multi-link synchronized channel access method in a wireless LAN system supporting a multi-link.

As shown in FIG. 3, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STA1 of the STA MLD1 may operate on a first link, and a STA2 of the STA MLD1 may operate on a second link. The STA1 and the STA2 may perform backoff operations to simultaneously transmit frames (e.g., synchronized frame transmissions) on the respective operating links.

The backoff operations performed for synchronized frame transmission may be backoff operations for the same access category (AC) on both the first link and the second link, and the same enhanced distributed channel access (EDCA) parameter(s) may be used for the backoff operations. Priorities of ACs may be defined as in Table 1 below, and contention windows (CWs) of ACs may be defined as in Table 2 below.

TABLE 1

| Priority | AC | Description |
|---|---|---|
| Lowest | AC_BK | Background |
| | AC_BE | Best effort |
| | AC_VI | Video |
| Highest | AC_VO | Voice |

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

Counter values for the backoff operations on the first link and the second link may be selected independently. The backoff operation may be an enhanced distributed channel access function (EDCAF). The counter value may mean a backoff counter value. The backoff operation may succeed first on one link among the first link and the second link. For example, a backoff operation may succeed first when a backoff counter becomes 0 on a link (e.g., first link) for which a small backoff counter value is selected. The backoff counter value of the link (e.g., first link) on which the backoff operation succeeds first may be maintained at 0 until a backoff operation succeeds on the other link (e.g., second link). That is, transmission on the first link may be delayed (e.g., held back) with the backoff counter value maintained at 0.

At a boundary of a slot in which the backoff operation succeeds on the other link (e.g., second link) (e.g., a slot in which the counter value becomes 0 on the other link), the STA MLD1 may transmit frames (e.g., PPDUs, data units) at the same time using both the first link and the second link. Such the transmission may be referred to as 'synchronized frame transmission'. The synchronized frame transmissions on the first link and the second link may be completed (e.g., end) at the same time. The AP MLD1 may receive frames from the STA MLD1, and may transmit block ACK (BA) frames on the first link and the second link after a short interframe space (SIFS) elapses from a completion time (e.g., end time) of the synchronized frame transmissions. Each of the STAT and the STA2 of STA MLD1 may receive the BA frame after a SIFS elapses from the completion time (e.g., end point) of the synchronized frame transmissions. In exemplary embodiments, a transmission and reception operation of a BA frame may refer to a transmission and reception operation of an ACK frame, and a transmission and reception operation of an ACK frame may refer to a transmission and reception operation of a BA frame.

FIG. 4 is a timing diagram illustrating a second exemplary embodiment of a multi-link synchronized channel access method in a wireless LAN system supporting a multi-link.

As shown in FIG. 4, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STA1 of the STA MLD1 may operate on a first link, and a STA2 of the STA MLD1 may operate on a second link. The STA1 and the STA2 may perform backoff operations to simultaneously transmit frames (e.g., synchronized frame transmissions) on the respective operating links.

The backoff operation may be an EDCAF. The backoff operations performed for synchronized frame transmission may be backoff operations for the same AC on both the first link and the second link, and the same EDCA parameter(s) may be used for the backoff operations. The EDCA parameters may be CW[AC] and/or QSRC[AC]. CW[AC] may be a CW for each AC. QSRC[AC] may be a quality of service (QoS) short retry counter (QSRC) for each AC. Counter values for the backoff operations on the first link and the second link may be selected independently. The backoff operation may succeed first on one link among the first link and the second link. For example, a backoff operation may succeed first when a backoff counter becomes 0 on a link (e.g., first link) for which a small backoff counter value is selected. The backoff counter value of the link (e.g., first link) on which the backoff operation succeeded first may be maintained at 0 until a backoff operation succeeds on the other link (e.g., second link). That is, transmission on the first link may be delayed (e.g., held back).

A backoff operation for AC_VO data (e.g., AC_VO data unit) (hereinafter referred to as 'AC_VO backoff operation') may also be performed on another link (e.g., second link) on which a backoff operation for AC_VI data (e.g., AC_VI data unit) (hereinafter referred to as 'AC_VI backoff operation') is performed. That is, the AC_VI backoff operation and the AC_VO backoff operation may be performed together on the second link. Before the AC_VI backoff operation is completed (e.g., the backoff counter value becomes 0 and the AC_VI backoff operation succeeds), the AC_VO backoff operation may be completed first (e.g., the backoff counter value becomes 0 and the AC_VO backoff operation succeeds). While the backoff operation is completed on the first link and the counter value thereof is maintained at 0, the backoff operation (e.g., AC_VO backoff operation) may be completed on the second link. In this case, since the AC_VI backoff operation succeeds on the first link and the AC_VO backoff operation succeeds on the second link, the STA MLD1 may perform a transmission operation of an AC_VI frame (e.g., frame including the AC_VI data) on the first link and a transmission operation of an AC_VO frame (e.g., frame including the AC_VO data) on the second link at a time when the counter value of the AC_VO backoff operation becomes 0. That is, the STA 2 of the second link may select transmission of the AC_VO frame. Accordingly, the AC_VI frame and the AC_VO frame may be transmitted simultaneously on the first link and the second link.

When the lengths of frames transmitted on the first link and the second link are different and/or when modulation and coding schemes (MCSs) applied to the frames on the first link and the second link are different, transmission completion times of the frames on the first link and the second link may be different. For synchronized transmissions of the first link and the second link, it may be necessary to set the transmission completion times of the frames to be the same. Padding bit(s) may be added to a frame having a shorter length so that the transmission completion times of the frames are the same on the first link and the second link. As another method, in order to make the transmission completion times of the frames on the first link and the second link equal to each other, the STA MLD1 (e.g., STA) may configure a frame in form of an aggregated (A)-MAC protocol data unit (MPDU) instead of adding padding bit(s). As yet another method, the STA MLD1 (e.g., STA) may transmit a dummy signal so that the transmission completion times of the frames on the first link and the second link are the same. The AP1 of AP MLD1 may receive the AC_VI frame from the STA1 and may transmit a BA frame (or ACK frame) on the first link after a SIFS elapses from a reception completion time of the AC_VI frame. The AP2 of AP MLD1 may receive the AC_VO frame (e.g., AC_VO PPDU+ padding bit(s)) from the STA2, and transmit a BA frame (or ACK frame) on the second link after a SIFS elapses from a reception completion time of the AC_VO frame.

On the second link, the AC_VI frame may not be transmitted according to an internal collision resolution procedure with the AC_VO frame. That is, transmission of the AC_VI frame may lose competition according to the internal collision resolution procedure. The STA2 of STA MLD1 may perform backoff operations on the first link and the second link to transmit the AC_VI frame in a multi-link synchronized scheme after an arbitration interframe space (AIFS) elapses. Since the previous AC_VI backoff operation on the first link succeeded and the AC_VI frame was transmitted, EDCA parameters (e.g., CW[AC] and/or QSRC [AC]) used for the AC_VI backoff operation on the first link may be initial values. Since the previous AC_VI backoff operation on the second link failed according to the internal collision resolution procedure and the AC_VI frame was not transmitted, EDCA parameters (e.g., CW[AC] and/or QSRC [AC]) for the AC backoff operation on the second link after simultaneous transmissions of frames on the first link and the second link may be doubled values. When the backoff operations succeed on both the first link and the second link, the STA1 and the STA2 of the STA MLD1 may transmit AC_VI frames simultaneously.

FIG. 5 is a timing diagram illustrating a third exemplary embodiment of a multi-link synchronized channel access method in a wireless LAN system supporting a multi-link.

As shown in FIG. 5, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STA1 of the STA MLD1 may operate on a first link, and a STA2 of the STA MLD1 may operate on a second link. The STA1 and the STA2 may perform backoff operations to simultaneously transmit frames (e.g., synchronized frame transmissions) on the respective operating links.

The backoff operation may be an EDCAF. The backoff operations performed for synchronized frame transmission may be backoff operations for the same AC on both the first link and the second link, and the same EDCA parameter(s) may be used for the backoff operations. Counter values for the backoff operations on the first link and the second link may be selected independently. The backoff operation may succeed first on one link among the first link and the second link. For example, a backoff operation may succeed first when a backoff counter becomes 0 on a link (e.g., first link) for which a small backoff counter value is selected. The backoff counter value of the link (e.g., first link) on which the backoff operation succeeded first may be maintained at 0 until a backoff operation succeeds on the other link (e.g., second link). That is, transmission on the first link may be delayed (e.g., held back).

The STA1 of STA MLD1 may perform both an AC_VI backoff operation and an AC_VO backoff operation on the first link. On the first link, the AC_VI backoff operation may succeed before the AC_VO backoff operation. For example, the AC_VI backoff counter value may become 0 before the AC_VO backoff counter value. In this case, the counter value of the AC_VI backoff operation on the first link may be 0, and transmission of the AC_VI frame on the first link may wait until the counter value of the AC_VI backoff operation on the second link becomes 0. The AC_VO backoff operation on the first link may be completed while waiting for transmission of the AC_VI frame on the first link. That is, the counter value of the AC_VO backoff operation on the first link may become 0. In this case, one of the success of the AC_VI backoff (e.g., AC_VI frame transmission operation) and the success of the AC_VO backoff (e.g., AC_VO frame transmission operation) may be selected by the internal collision resolution procedure.

During multi-link synchronized transmission, an internal collision resolution procedure for one link may be required. In this case, it may be determined that frame transmission for a backoff operation that completed first on one link won in the internal collision resolution procedure. Therefore, transmission of the AC_VI frame may be determined to have won in the internal collision resolution procedure, and transmission of the AC_VO frame may be determined to have lost in the internal collision resolution procedure. If both the AC_VI backoff operations on the first link and the second link are successful (e.g., the AC_VI backoff counter value on the second link becomes 0 while the AC_VI backoff counter value on the first link is maintained at 0), the STA MLD1 (e.g., STA1 and STA2) may transmit AC_VI frames simultaneously using the first link and the second link.

Since the previous AC_VO backoff operation on the first link failed according to the internal collision resolution procedure and the AC_VO frame was not transmitted, EDCA parameters (e.g., CW[AC] and/or QSRC[AC]) used for an AC_VO backoff operation on the first link after simultaneous transmissions of frames on the first link and the second link may be doubled values. As another method, if the AC_VO backoff operation failed due to contention with another backoff operation (e.g., AC_VI backoff operation) while maintaining the counter value at 0, EDCA parameters (e.g., CW[AC] and/or QSRC[AC]) used for an AC_VO backoff operation on the first link after simultaneous transmissions of frames on the first link and the second link may not be doubled. That is, the EDCA parameters (e.g., the same CW[AC] and/or the same QSRC[AC]) used in the previous AC_VO backoff operation may be used in the new AC_VO backoff operation.

FIG. 6 is a timing diagram illustrating a fourth exemplary embodiment of a multi-link synchronized channel access method in a wireless LAN system supporting a multi-link.

As shown in FIG. 6, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STA1 of the STA MLD1 may operate on a first link, and a STA2 of the STA MLD1 may operate on a second link. The STA1 and the STA2 may perform backoff operations to simultaneously transmit frames (e.g., synchronized frame transmissions) on the respective operating links.

The backoff operation may be an EDCAF. The backoff operations performed for synchronized frame transmission may be backoff operations for the same AC on both the first link and the second link, and the same EDCA parameter(s) may be used for the backoff operations. Counter values for the backoff operations on the first link and the second link may be selected independently. The backoff operation may succeed first on one link among the first link and the second link. For example, a backoff operation may succeed first when a backoff counter becomes 0 on a link (e.g., first link) for which a small backoff counter value is selected. The backoff counter value of the link (e.g., first link) on which the backoff operation succeeded first may be maintained at 0 until a backoff operation succeeds on the other link (e.g., second link). That is, transmission on the first link may be delayed (e.g., held back).

The STAT of STA MLD1 may perform both an AC_VI backoff operation and an AC_VO backoff operation on the first link. On the first link, the AC_VI backoff operation may succeed before the AC_VO backoff operation. In this case, the counter value of the AC_VI backoff operation on the first link may be 0, and transmission of the AC_VI frame on the first link may wait until the counter value of the AC_VI backoff operation on the second link becomes 0 while the counter value of the AC_VI backoff operation on the first link is maintained at 0. The AC_VO backoff operation on the first link may be completed while waiting for AC_VI frame transmission on the first link. That is, the counter value of the AC_VO backoff operation on the first link may become 0. If the counter values of two or more backoff operations are 0, an internal collision resolution procedure may be performed to select one frame transmission.

A backoff operation for an AC with a higher priority may be determined to win in the internal collision resolution procedure. The priorities of ACs may be the priorities defined in Table 1. Therefore, the AC_VO backoff operation (e.g., AC_VO frame transmission operation) may be determined to win in the internal collision resolution procedure, and the AC_VI backoff operation (e.g., AC_VI frame transmission operation) may be determined to lose in the internal resolution procedure. If the AC_VI backoff operation succeeds on the second link (i.e., the counter value of the AC_VI backoff operation becomes 0), the STA1 may transmit an AC_VO frame on the first link, and the STA2 may transmit an AC_VI frame on the second link. That is, the AC_VO frame and the AC_VI frame may be transmitted simultaneously on the first link and the second link.

The length of the AC_VO frame may be different from the length of the AC_VI frame. For synchronized transmissions on the first link and the second link, it may be necessary to set transmission completion times of the frames to be the same. In order to align the transmission completion times of the frames on the first link and the second link, a frame with a shorter length (e.g., AC_VO frame of the first link) may include a portion of data (e.g., AC_VI data) that has lost in the internal collision resolution procedure. In this case, the AC_VO frame may be generated in form of an A-MPDU. The AC_VI data (e.g., AC_VI frame) may be divided by a fragmentation scheme. The AP1 may receive the AC_VO frame (e.g., 'AC_VO data+AC_VI data part 1' or 'AC_VO MPDU+AC_VI MPDU part 1') from the STA1 on the first link, and transmit a BA frame for the AC_VO frame to the STA1. The AP2 may receive the AC_VI frame from the STA2 on the second link and transmit a BA frame for the AC_VI frame to the STA2.

Since the previous AC_VI backoff operation on the first link failed according to the internal collision resolution procedure and the AC_VI frame was not transmitted, EDCA parameters (e.g., CW[AC] and/or QSRC[AC]) used for an AC_VI backoff operation on the first link after the simultaneous transmissions of the frames on the first link and the second link may be doubled parameters. As another method, if the AC_VI backoff operation failed due to competition with another backoff operation (e.g., AC_VO backoff operation) while maintaining the counter value at 0, EDCA parameters (e.g., CW[AC] and/or QSRC[AC]) used for an AC_VI backoff operation on the first link after the simultaneous transmissions of the frames on the first link and the second link may not be doubled. That is, the EDCA parameters used in the new AC_VI backoff operation may be the same as the EDCA parameters used in the previous AC_VI backoff operation.

FIG. 7 is a timing diagram illustrating a fifth exemplary embodiment of a multi-link synchronized channel access method in a wireless LAN system supporting a multi-link.

As shown in FIG. 7, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STAT of the STA MLD1 may operate on a first link, and a STA2 of the STA MLD1 may operate on a second link. The STAT and the STA2 may perform backoff operations to simultaneously transmit frames (e.g., synchronized frame transmissions) on the respective operating links.

The backoff operation may be an EDCAF. The backoff operations performed for synchronized frame transmission may be backoff operations for the same AC on both the first link and the second link, and the same EDCA parameter(s) may be used for the backoff operation(s). Counter values for the backoff operations on the first link and the second link may be selected independently. The backoff operation may succeed first on one link among the first link and the second link. For example, a backoff operation may succeed first when a backoff counter becomes 0 on a link (e.g., first link) for which a small backoff counter value is selected. The backoff counter value of the link (e.g., first link) on which the backoff operation succeeded first may be maintained at 0 until a backoff operation succeeds on the other link (e.g., second link). That is, transmission on the first link may be delayed (e.g., held back).

The STA1 of STA MLD1 may perform both an AC_VI backoff operation and an AC_VO backoff operation on the first link. On the first link, the AC_VI backoff operation may succeed before the AC_VO backoff operation. In this case, the counter value of the AC_VI backoff operation on the first link may be 0, and transmission of the AC_VI frame on the first link may wait until the counter value of the AC_VI backoff operation on the second link becomes 0. The AC_VO backoff operation on the first link may be completed while waiting for AC_VI frame transmission on the first link. That is, the counter value of the AC_VO backoff operation on the first link may become 0. If the counter values of two or more backoff operations are 0, an internal collision resolution procedure may be performed to select one frame transmission.

A backoff operation for an AC with a higher priority may be determined to win in the internal collision resolution procedure. The priorities of ACs may be the priorities defined in Table 1. Therefore, the AC_VO frame transmission may be determined to win in the internal collision resolution procedure, and the AC_VI frame transmission may be determined to lose in the internal resolution procedure. If the AC_VI backoff operation succeeds on the second link (i.e., the counter value of the AC_VI backoff operation becomes 0), the STA1 may transmit an AC_VO frame on the first link, and the STA2 may transmit an AC_VI frame on the second link. That is, the AC_VO frame and the AC_VI frame may be transmitted simultaneously on the first link and the second link.

The length of the AC_VO frame may be different from the length of the AC_VI frame. For synchronized transmissions on the first link and the second link, it may be necessary to set transmission completion times of the frames to be the same. Padding bit(s) may be added to a frame (e.g., AC_VI frame) having a shorter length so that the transmission completion times of the frames are the same on the first link and the second link. As another method, in order to make the transmission completion times of the frames on the first link and the second link equal to each other, the STA MLD2 (e.g., STA2) may generate the AC_VI frame in form of an A-MPDU by adding another frame to be transmitted without of adding padding bit(s). As yet another method, the STA MLD2 (e.g., STA2) may transmit a dummy signal so that the transmission completion times of the frames on the first link and the second link are the same. On the first link, the AP1 may receive the AC_VO frame from the STA1 and may transmit a BA frame for the AC_VO frame to the STA1. On the second link, the AP2 may receive the AC_VI frame (e.g., AC_VI PPDU+padding bit(s)) from the STA2, and transmit a BA frame for the AC_VI frame.

Since the previous AC_VI backoff operation on the first link failed according to the internal collision resolution procedure and the AC_VI frame was not transmitted, EDCA parameters (e.g., CW[AC] and/or QSRC[AC]) used for an AC_VI backoff operation on the first link after simultaneous transmissions of frames on the first link and the second link may be doubled values. As another method, if the AC_VI backoff operation failed due to contention with another backoff operation (e.g., AC_VO backoff operation) while maintaining the counter value at 0, EDCA parameters (e.g., CW[AC] and/or QSRC[AC]) used for an AC_VI backoff operation on the first link after simultaneous transmissions of frames on the first link and the second link may not be doubled. That is, the EDCA parameters (e.g., the same CW[AC] and/or the same QSRC[AC]) used in the previous AC_VI backoff operation may be used in the new AC_VI backoff operation.

FIG. 8 is a timing diagram illustrating a sixth exemplary embodiment of a multi-link synchronized channel access method in a wireless LAN system supporting a multi-link.

As shown in FIG. 8, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STAT of the STA MLD1 may operate on a first link, and a STA2 of the STA MLD1 may operate on a second link. The STAT and the STA2 may perform backoff operations to simultaneously transmit frames (e.g., synchronized frame transmissions) on the respective operating links.

The backoff operation may be an EDCAF. The backoff operations performed for synchronized frame transmission may be backoff operations for the same AC on both the first link and the second link, and the same EDCA parameter(s) may be used for the backoff operation(s). Counter values for the backoff operations on the first link and the second link may be selected independently. The backoff operation may succeed first on one link among the first link and the second link. For example, a backoff operation may succeed first when a backoff counter becomes 0 on a link (e.g., first link) for which a small backoff counter value is selected. The backoff counter value of the link (e.g., first link) on which the backoff operation succeeded first may be maintained at 0 until a backoff operation succeeds on the other link (e.g., second link). That is, transmission on the first link may be delayed (e.g., held back).

The STAT of STA MLD1 may perform both an AC_VI backoff operation and an AC_VO backoff operation on the first link. On the first link, the AC_VI backoff operation may succeed before the AC_VO backoff operation. In this case, the counter value of the AC_VI backoff operation on the first link may be 0, and transmission of the AC_VI frame on the first link may wait until the counter value of the AC_VI backoff operation on the second link becomes 0. The AC_VO backoff operation on the first link may be completed while waiting for AC_VI frame transmission on the first link. That is, the counter value of the AC_VO backoff operation on the first link may become 0. If the counter values of two or more backoff operations are 0, an internal collision resolution procedure may be performed to select one frame transmission.

A backoff operation for an AC with a higher priority may be determined to win in the internal collision resolution procedure. The priorities of ACs may be the priorities defined in Table 1. Therefore, the AC_VO backoff operation (e.g., AC_VO frame transmission operation) may be determined to win in the internal collision resolution procedure, and the AC_VI backoff operation (e.g., AC_VI frame transmission operation) may be determined to lose in the internal resolution procedure. If the AC_VO backoff operation succeeds on the first link (i.e., the counter value of the AC_VO backoff operation becomes 0), the STA1 may transmit an AC_VO frame on the first link.

Since the STA MLD1 is an NSTR STA MLD, the second link may be in a deaf period during a transmission period of the frame on the first link. A channel sensing operation and/or reception operation may be impossible in the deaf period. The STA2 may not be able to perform a channel sensing operation (e.g., clear channel assessment (CCA) operation) in the deaf period. Therefore, at a time of frame transmission on the first link, the STA2 may freeze the AC_VI backoff operation on the second link. For example, the counter value of the AC_VI backoff operation on the second link may be maintained at 4. The STA2 may resume the AC_VI backoff operation using the maintained counter value (e.g., 4) when the deaf period ends. If the resumed AC_VI backoff operation succeeds, the STA2 may transmit the AC_VI frame. The AC_VI frame transmitted on the second link may include the AC_VI data (e.g., AC_VI PPDU, AC_VI data unit) intended to be transmitted on the first link. Alternatively, the STA MLD may perform synchronized transmission for the AC_VI frame on the first link and the second link. That is, the AC_VI frames may be transmitted simultaneously on the first link and the second link.

FIG. 9 is a timing diagram illustrating a seventh exemplary embodiment of a multi-link synchronized channel access method in a wireless LAN system supporting a multi-link.

As shown in FIG. 9, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STAT of the STA MLD1 may operate on a first link, and a STA2 of the STA MLD1 may operate on a second link. The STAT and the STA2 may perform backoff operations to simultaneously transmit frames (e.g., synchronized frame transmissions) on the respective operating links.

The backoff operation may be an EDCAF. The backoff operations performed for synchronized frame transmission may be backoff operations for the same AC on both the first link and the second link, and the same EDCA parameter(s) may be used for the backoff operations. Counter values for the backoff operations on the first link and the second link may be selected independently. The backoff operation may succeed first on one link among the first link and the second link. For example, a backoff operation may succeed first when a backoff counter becomes 0 on a link (e.g., first link) for which a small backoff counter value is selected. The backoff counter value of the link (e.g., first link) on which the backoff operation succeeded first may be maintained at 0 until a backoff operation succeeds on the other link (e.g., second link). That is, transmission on the first link may be delayed (e.g., held back).

The STAT of STA MLD1 may perform both an AC_VI backoff operation and an AC_VO backoff operation on the first link. On the first link, the AC_VI backoff operation may succeed before the AC_VO backoff operation. In this case, the counter value of the AC_VI backoff operation on the first link may be 0, and transmission of the AC_VI frame on the first link may wait until the counter value of the AC_VI backoff operation on the second link becomes 0. The AC_VO backoff operation on the first link may be completed while waiting for AC_VI frame transmission on the first link. That is, the counter value of the AC_VO backoff operation on the first link may become 0. If the counter values of two or more backoff operations are 0, an internal collision resolution procedure may be performed to select one frame transmission.

A backoff operation for an AC with a higher priority may be determined to win in the internal collision resolution procedure. The priorities of ACs may be the priorities defined in Table 1. Therefore, the AC_VO frame transmission may be determined to win in the internal collision resolution procedure, and the AC_VI frame transmission may be determined to lose in the internal resolution procedure. If the AC_VO backoff operation succeeds on the first link (i.e., the counter value of the AC_VO backoff operation becomes 0), the STA1 may transmit an AC_VO frame on the first link.

Since the STA MLD1 is an NSTR STA MLD, the second link may be in a deaf period during a transmission period of the frame on the first link. A channel sensing operation and/or reception operation may be impossible in the deaf period. The STA2 may not be able to perform a channel sensing operation (e.g., CCA operation) in the deaf period. Therefore, at a time of frame transmission on the first link, the STA2 may freeze the AC_VI backoff operation on the second link. For example, the counter value of the AC_VI backoff operation on the second link may be maintained at 2.

Since a channel sensing operation cannot be performed in the deaf period, the STA2 may not be able to set a network allocation vector (NAV). Accordingly, the STA2 may wait for a preset time after the deaf period ends. The preset time may be a MediumSyncDelay value. When a period corresponding to MediumSyncDelay ends, the STA2 may resume the AC_VI backoff operation using the maintained counter value (e.g., 2). If the resumed AC_VI backoff operation succeeds, the STA2 may transmit the AC_VI frame.

In order for the STA2 of STA MLD1 to perform a normal operation after the deaf period ends, the AP MLD1 (e.g., AP2) may transmit a frame (e.g., QoS Null frame) including a duration field set to 0 after the deaf period ends. The AP2 may perform a backoff operation for transmission of the QoS Null frame in the deaf period. Parameter(s) used in the backoff operation for transmission of the QoS Null frame may be EDCA parameter(s) of AC_VO which has the highest priority. The STA2 may receive the QoS Null frame from the AP2 after the deaf period ends, and may set a NAV based on the value of the duration field included in the QoS Null frame. Since the value of the duration field is 0, the NAV may be set to 0. When the NAV is set to 0, the STA2 may end a timer for MediumSyncDelay, and perform a normal operation. That is, after receiving the QoS Null frame, the STA2 may resume the AC_VI backoff operation using the maintained counter value (e.g., 2). If the resumed AC_VI backoff operation succeeds, the STA2 may transmit the AC_VI frame.

FIG. 10 is a timing diagram illustrating an eighth exemplary embodiment of a multi-link synchronized channel access method in a wireless LAN system supporting a multi-link.

As shown in FIG. 10, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STA1 of the STA MLD1 may operate on a first link, and a STA2 of the STA MLD1 may operate on a second link. The STA1 and the STA2 may perform backoff operations to simultaneously transmit frames (e.g., synchronized frame transmissions) on the respective operating links.

The backoff operation may be an EDCAF. The backoff operations performed for synchronized frame transmission may be backoff operations for the same AC on both the first link and the second link, and the same EDCA parameter(s) may be used for the backoff operations. Counter values for the backoff operations on the first link and the second link may be selected independently. The backoff operation may succeed first on one link among the first link and the second link. For example, a backoff operation may succeed first when a backoff counter becomes 0 on a link (e.g., first link) for which a small backoff counter value is selected. The backoff counter value of the link (e.g., first link) on which the backoff operation succeeded first may be maintained at 0 until a backoff operation succeeds on the other link (e.g., second link). That is, transmission on the first link may be delayed (e.g., held back).

The STA1 of STA MLD1 may perform both an AC_VI backoff operation and an AC_VO backoff operation on the first link. The STA2 of STA MLD1 may perform both the AC_VI backoff operation and the AC_VO backoff operation on the second link. The backoff operation may succeed first on one link among the two links. For example, the AC_VI backoff operation on the first link may succeed first when the backoff counter value first becomes 0. In this case, the counter value of the AC_VI backoff operation on the first link may be 0, and transmission of the AC_VI frame on the first link may wait until the counter value of the backoff operation on the second link becomes 0. The AC_VO backoff operation on the first link may be completed while waiting for AC_VI frame transmission on the first link. That is, the counter value of the AC_VO backoff operation on the first link may become 0. If the counter values of two or more backoff operations are 0, an internal collision resolution procedure may be performed to select one frame transmission.

A backoff operation for an AC with a higher priority may be determined to win in the internal collision resolution procedure. The priorities of ACs may be the priorities defined in Table 1. Therefore, the AC_VO frame transmission may be determined to win in the internal collision resolution procedure, and the AC_VI frame transmission may be determined to lose in the internal resolution procedure. In this case, the counter value of the AC_VO backoff operation on the first link may be maintained at 0, and the AC_VO frame transmission on the first link may wait until the backoff operation on the second link succeeds.

For multi-link synchronized transmissions, the AC_VI backoff operation and the AC_VO backoff operation may be performed on the second link. The AC_VO backoff operation may be completed before the AC_VI backoff operation is completed on the second link. If the counter value of the AC_VO backoff operation on the second link becomes 0 while the counter value of the AC_VO backoff operation on the first link is maintained at 0, the AC_VO backoff operation on the first link and the AC_VO backoff operation on the second link may be determined to be successful. At a time when the counter value of the AC_VO backoff operation on the second link becomes, which is completed later than the AC_VO backoff operation, the STA1 may transmit an AC_VO frame on the first link, and the STA2 may transmit an AC_VO frame on the second link. That is, the AC_VO frames may be transmitted simultaneously on the first link and the second link.

The lengths of the AC_VO frames on the first link and the second link may be different. For example, the AC_VO frames transmitted on the first link and the second link may not be frames started for initial synchronized transmissions. For synchronized transmissions on the first link and the second link, it may be necessary to set transmission completion times of the frames to be the same. In this case, in order to match the lengths of the AC_VO frames on the first link and the second link, padding bit(s) may be added to one AC_VO frame. As another method, instead of adding padding bit(s), one AC_VO frame may be generated in form of an A-MPDU. As yet another method, a dummy signal may be transmitted to make the transmission completion times of the AC_VO frames on the first link and the second link the same. The AP1 may receive the AC_VO frame from the STA1 on the first link and may transmit a BA frame for the AC_VO frame to the STA1. The AP2 may receive the AC_VO frame from the STA2 on the second link and may transmit a BA frame for the AC_VO frame to the STA2.

Since the previous AC_VI backoff operation on each of the first link and the second link failed according to the internal collision resolution procedure and the AC_VI frame was not transmitted, EDCA parameters (e.g., CW[AC] and/ or QSRC[AC]) used for an AC_VI backoff operation on each of the first link and the second link after the simultaneous transmissions of the frames on the first link and the second link may be doubled values. As another method, if the AC_VI backoff operation failed due to competition with another backoff operation (e.g., AC_VO backoff operation) while maintaining the counter value at 0, EDCA parameters (e.g., CW[AC] and/or QSRC[AC]) used for an AC_VI backoff operation on each of the first link and the second link after the simultaneous transmissions of the frames on the first link and the second link may not be doubled. That is, the EDCA parameters used in the new AC_VI backoff operation may be the same as the EDCA parameters used in the previous AC_VI backoff operation.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A method of a first device, comprising:
    performing a first backoff operation for a first access category (AC) on a first link;
    performing a second backoff operation for a second AC on the first link;
    performing a third backoff operation for a third AC on a second link;
    in response to that the first backoff operation and the second backoff operation succeed on the first link, selecting one AC from among the first AC and the second AC; and
    in response to that the third backoff operation succeeds, simultaneously performing a first transmission operation of a first frame including a data unit corresponding to the selected one AC on the first link and a second transmission operation of a second frame including a data unit corresponding to the third AC on the second link.

2. The method according to claim 1, further comprising:
    in response to that the first transmission operation and the second transmission operation are completed, performing a fourth backoff operation for an unselected AC other than the selected one AC among the first AC and the second AC, wherein enhanced distributed channel access (EDCA) parameters used in the fourth backoff operation are same as EDCA parameters used in a previous backoff operation of the unselected AC, and the previous backoff operation is the first backoff operation or the second backoff operation.

3. The method according to claim 2, wherein the EDCA parameters include at least one of CW[AC] or QSRC[AC], where the CW[AC] is a content window (CW) for each of the first AC, the second AC, and the third AC, and the QSRC[AC] is a quality of service (QoS) short retry counter (QSRC) for each of the first AC, the second AC, and the third AC.

4. The method according to claim 1, wherein when at least one backoff operation among the first backoff operation and the second backoff operation succeeds before the third backoff operation succeeds, a counter value of the at least one backoff operation is maintained at 0.

5. The method according to claim 1, wherein when at least one backoff operation among the first backoff operation and the second backoff operation succeeds before the third backoff operation succeeds, a data unit corresponding to an AC associated with the at least one backoff operation is not transmitted.

6. The method according to claim 1, wherein the data unit corresponding to the selected one AC is a data unit corresponding to an AC associated with a backoff operation that succeeds first among the first backoff operation and the second backoff operation.

7. The method according to claim 1, wherein the data unit corresponding to the selected one AC is a data unit corresponding to an AC having a higher priority among the first AC and the second AC.

8. The method according to claim 1, wherein padding bit(s) are added to one of the first frame and the second frame in order to align end times of the first transmission operation and the second transmission operation.

9. The method according to claim 1, wherein a portion of the first data unit is added to one of the first frame and the second frame in order to align end times of the first transmission operation and the second transmission operation.

10. The method according to claim 9, wherein the first data unit is a data unit other than the data unit corresponding to the selected one AC among a data unit corresponding to the first AC and a data unit corresponding to the second AC.

11. A first device comprising:

a processor; and a memory storing one or more instructions executable by the processor, wherein the one or more instructions are executed to perform:

performing a first backoff operation for a first access category (AC) on a first link;

performing a second backoff operation for a second AC on the first link;

performing a third backoff operation for a third AC on a second link;

in response to that the first backoff operation and the second backoff operation succeed on the first link, selecting one AC from among the first AC and the second AC; and in response to that the third backoff operation succeeds, simultaneously performing a first transmission operation of a first frame including a data unit corresponding to the selected one AC on the first link and a second transmission operation of a second frame including a data unit corresponding to the third AC on the second link.

12. The first device according to claim 11, wherein the one or more instructions are further executed to perform: in response to that the first transmission operation and the second transmission operation are completed, performing a fourth backoff operation for an unselected AC other than the selected one AC among the first AC and the second AC, wherein enhanced distributed channel access (EDCA) parameters used in the fourth backoff operation are same as EDCA parameters used in a previous backoff operation of the unselected AC, and the previous backoff operation is the first backoff operation or the second backoff operation.

13. The first device according to claim 12, wherein the EDCA parameters include at least one of CW[AC] or QSRC[AC], where the CW[AC] is a content window (CW) for each of the first AC, the second AC, and the third AC, and the QSRC[AC] is a quality of service (QoS) short retry counter (QSRC) for each of the first AC, the second AC, and the third AC.

14. The first device according to claim 11, wherein when at least one backoff operation among the first backoff operation and the second backoff operation succeeds before the third backoff operation succeeds, a counter value of the at least one backoff operation is maintained at 0.

15. The first device according to claim 11, wherein when at least one backoff operation among the first backoff operation and the second backoff operation succeeds before the third backoff operation succeeds, a data unit corresponding to an AC associated with the at least one backoff operation is not transmitted.

16. The first device according to claim 11, wherein the data unit corresponding to the selected one AC is a data unit corresponding to an AC associated with a backoff operation that succeeds first among the first backoff operation and the second backoff operation.

17. The first device according to claim 11, wherein the data unit corresponding to the selected one AC is a data unit corresponding to an AC having a higher priority among the first AC and the second AC.

18. The first device according to claim 11, wherein padding bit(s) are added to one of the first frame and the second frame in order to align end times of the first transmission operation and the second transmission operation.

19. The first device according to claim 11, wherein a portion of the first data unit is added to one of the first frame and the second frame in order to align end times of the first transmission operation and the second transmission operation.

20. The first device according to claim 19, wherein the first data unit is a data unit other than the data unit corresponding to the selected one AC among a data unit corresponding to the first AC and a data unit corresponding to the second AC.

* * * * *